United States Patent [19]
Yamashita

[11] Patent Number: 5,157,513
[45] Date of Patent: Oct. 20, 1992

[54] CIRCUIT AND METHOD FOR REDUCING THE TIMEBASE CORRECTION REQUIREMENTS OF AN OPTICAL VIDEODISC PLAYER IN SCAN MODE

[75] Inventor: Noriyuki Yamashita, Tokyo, Japan

[73] Assignee: Sony Corporation, Tokyo, Japan

[21] Appl. No.: 492,733

[22] Filed: Mar. 13, 1990

[30] Foreign Application Priority Data

Mar. 15, 1989 [JP] Japan ................................ 1-62959

[51] Int. Cl.⁵ .............................................. G11B 7/00
[52] U.S. Cl. ...................................... 358/342; 358/338; 358/322; 369/47; 369/50; 369/133; 369/240; 369/53; 369/58; 369/44.32
[58] Field of Search ................... 369/47, 50, 133, 240, 369/32, 53, 58, 44.32; 358/338, 342, 322, 327

[56] References Cited

U.S. PATENT DOCUMENTS 4,468,709 8/1984 Kenjiyo .
4,819,221 4/1989 Overath et al. ....................... 369/50

FOREIGN PATENT DOCUMENTS 0128426 12/1984 European Pat. Off. .
2498861 7/1982 France .
2603149 2/1988 France .

OTHER PUBLICATIONS

Japanese Patent Abstract #59146280 vol. 8 #277 Dec. 1984.

Primary Examiner—Robert L. Richardson
Attorney, Agent, or Firm—Philip M. Shaw, Jr.

[57] ABSTRACT

A video disc player and the method of its operation are such that in a so-called scan playback mode a track jump is completed at the center of eccentricity of the track on the optical video disc so that various characteristics relating to timebase correction are improved.

13 Claims, 8 Drawing Sheets

CIRCUIT AND METHOD FOR REDUCING THE TIMEBASE CORRECTION REQUIREMENTS OF AN OPTICAL VIDEODISC PLAYER IN SCAN MODE

BACKGROUND OF THE INVENTION

1. Field of the Invention

The present invention relates generally to optical video disc players and, more particularly, is directed to an optical video disc player in which an optical video disc recorded in a constant linear velocity format is reproduced in a so-called scan playback mode.

2. Description of the Prior Art

Figure 1:
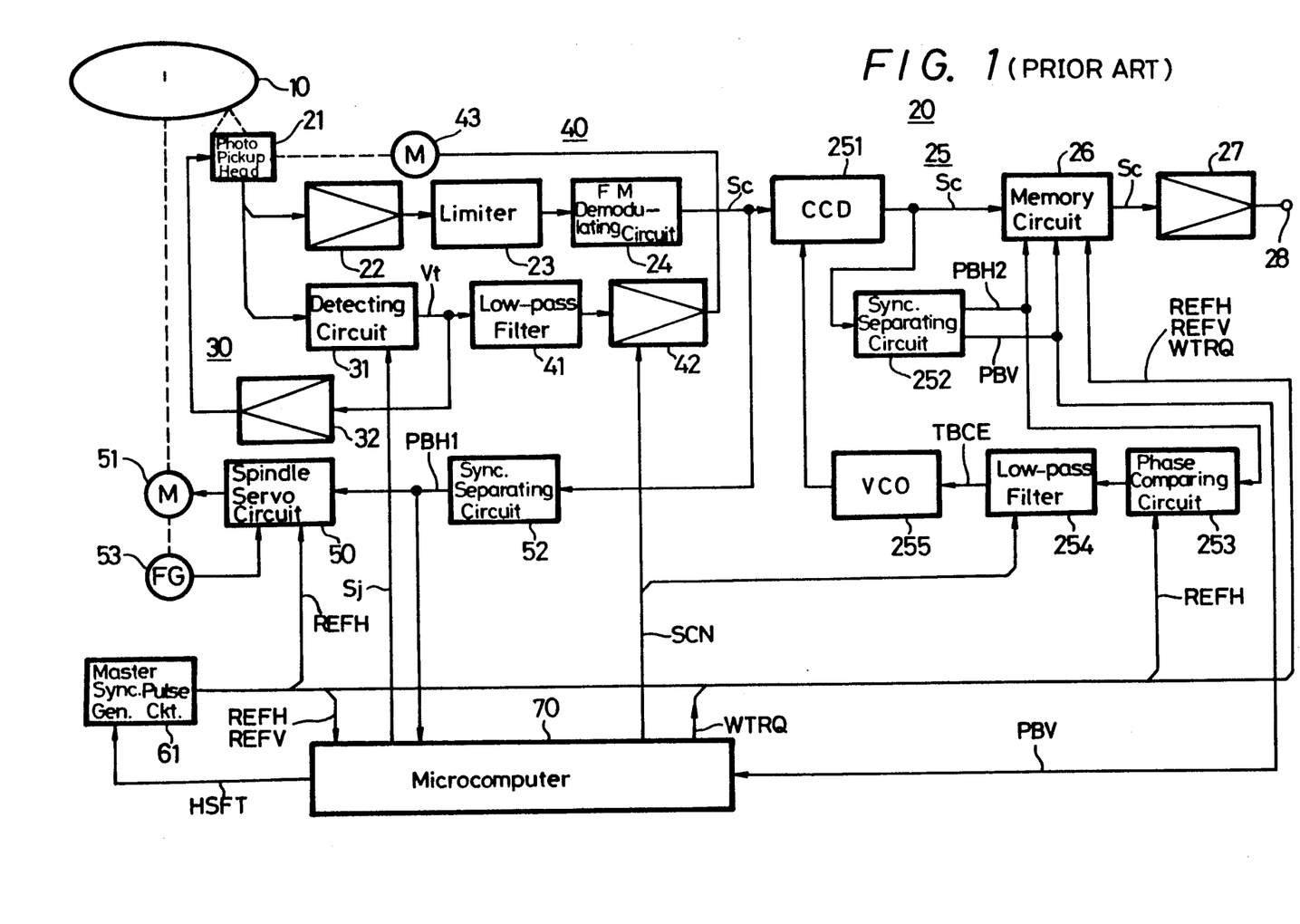
FIG. 1 is a block diagram showing an example of a prior-art optical video disc player.

In order to understand the present invention more clearly, let us first describe an example of a prior-art optical video disc player with reference to FIG. 1.

Referring to FIG. 1, there is provided a microcomputer 70 which generally controls the operation of this video disc player. An optical video disc 10 is provided, on which there is recorded an FM-modulated color composite video signal, in a predetermined format, for example, CLV (constant linear velocity) format. The signal is recorded on a spiral track on the videodisc. Due to manufacturing tolerances, or other reasons, the track may be eccentric, i.e., the radial position of the track may vary about a center of eccentricity. The optical video disc 10 is rotated by a spindle motor 51 whose rotation is servo-controlled by the spindle servo circuit 50 as will be described later.

In the reproducing circuit 20, there is provided a photo pickup head (optical head) 21 comprising a laser light emitting element, a receiving element for receiving the laser light emitted from the laser light emitting element, an objective lens, a tracking coil for moving the optical axis of the objective lens in the radial direction of the disc 10, et cetera. The photo pickup head 21 is moved in the radial direction of the optical video disc 10 by the sled motor 43.

In the tracking servo circuit 30, one portion of the output signal from the photo pickup head 21 is supplied to the detecting circuit 31 which derives a tracking error voltage Vt. This voltage Vt is supplied through an amplifier 32 to the tracking coil of the photo pickup head 21 so that the tracking of the objective lens (not shown) is servo-controlled.

In the sled servo circuit 40, the tracking error voltage Vt from the detecting circuit 31 is supplied to a low-pass filter 41 from which there is derived a DC component of the tracking error voltage Vt. This DC component is supplied through an amplifier 42 to the sled motor 43 so that a sled servo is performed.

Accordingly, in the normal reproduction mode, the tracking servo circuit 30 and the sled servo circuit 40 enable the photo pickup head 21 to correctly follow the track of the optical video disc 10 so that a reproduced signal is obtained from the photo pickup head 21.

The reproduced signal is supplied through the playback amplifier 22 and the limiter 23 to the FM demodulating circuit 24, in which it is FM-demodulated to provide a color composite video signal Sc. The color composite video signal Sc is supplied to the time base corrector (TBC) 25, in which any timebase fluctuation of the video signal Sc is removed.

The signal Sc from the FM demodulating circuit 24 is supplied to the charge coupled device (CCD) 251, and the signal Sc from the CCD 251 is supplied to the synchronizing separating circuit 252, from which there are derived a vertical synchronizing pulse PBV and a horizontal synchronizing pulse PBH2. The horizontal synchronizing pulse PBH2 is supplied to the phase comparing circuit 253. The master sync. (synchronizing) pulse generating circuit 61 generates a synchronizing pulse REFH having a reference horizontal frequency. This synchronizing pulse REFH is also supplied to the phase comparing circuit 253.

The phase comparing circuit 253 derives a phase-compared output of the pulses PBH2 and REFH. The phase-compared output is supplied to the low-pass filter 254 which derives a time base error voltage TBCE. The time base error voltage TBCE changes level in accordance with the phase difference between the pulses PBH2 and REFH. This time base error voltage TBCE is supplied to the voltage controlled oscillator (VCO) 255 as a control signal, and the oscillation signal from the VCO 255 is supplied to the CCD 252 as a clock signal.

Accordingly, the synchronizing pulse PBH2 has a constant phase synchronized with the reference pulse REFH so that any time base fluctuation in the video signal Sc from the CCD 251 caused by a jitter component, eccentricity of the track on the optical video disc 10, or the like is removed. This video signal Sc is supplied through the memory circuit 26 and the amplifier 27 to the output terminal 28.

The memory circuit 26 is utilized to effect a special playback or the like, and comprises an analog-to-digital (A/D) converter for converting the input signal Sc to a digital signal, a field memory in which the digitized signal Sc is written, a digital-to-analog (D/A) converter for converting the digital signal Sc read-out from the field memory to an analog signal and a controller for controlling the above-described circuits, though not shown. In the normal reproduction mode, the memory circuit 26 is by-passed so that the input signal Sc is directly outputted.

Further, the video signal Sc from the FM demodulating circuit 24 is supplied to the synchronizing separating circuit 52 which derives a horizontal synchronizing pulse PBH1. The horizontal synchronizing pulse PBH1 is supplied to the servo circuit 50, and the pulse REFH from the reference signal generating circuit 61 is supplied to the servo circuit 50, whereby the rotation of the spindle motor 51 is controlled so that the pulse PBH1 can be synchronized with the pulse REFH, and thus the aforementioned spindle servo is carried out.

With the employment of the spindle servo utilizing the pulses PBH1 and REFH, the lock range is narrow so that, for example, when the optical video disc 10 starts rotating or the like, the servo operation can not be properly carried out. Therefore, a frequency generator 53 is coupled to the spindle motor 51 and the output signal of the frequency generator 53 is supplied to the servo circuit 50 to back-up the spindle servo utilizing the pulses PBH1 and REFH.

The video disc player is operated in the normal playback mode as described above.

In the aforementioned video disc player, if the photo pickup head 21 is moved in the radial direction of the optical video disc 10 at a speed higher than that of the normal playback mode while the tracking of the objective lens within the photo pickup head 21 is servo-controlled, then the objective lens attempts to stay in the track by the action of the tracking servo circuit 30 against the movement of the photo pickup head 21.

When the photo pickup head 21 is moved to the controllable limit of the tracking servo, the objective lens is caused to make a track jump to a new track (in practice, at that time, the tracking servo is turned OFF and the track jump is forcibly effected) and the tracking servo is reactivated so that the photo pickup head 21 tracks the new track.

Accordingly, regardless of the movement of the photo pickup head 21 at the speed higher than that in the normal playback mode, a normal video signal Sc having no noise component due to mistracking can be intermittently produced. Therefore, utilizing the video signal Sc thus normally reproduced, it is possible to obtain a fast forward or fast rewind reproduced picture. In the following description, this operation mode will hereinafter be referred to as scan mode or scan playback mode.

In the scan playback mode, the microcomputer 70 supplies the amplifier 42 with a control signal SCN to cause the photo pickup head 21 to move towards inner or the outer periphery of the optical video disc 10 at a speed higher than that of the normal playback mode. Also, the microcomputer 70 supplies the tracking displacement amount detecting circuit 31 with a jump control signal that causes the objective lens within the photo pickup head 21 to perform a track jump.

The tracking displacement amount detecting circuit 31 detects the tracking condition by detecting the amplitude of the output video signal from the photo pickup head 21. When a jump signal Sj (which will be described later) is supplied by the microcomputer 70 to the detecting circuit 31, then the jump operation of the photo pickup head 21 becomes possible. Therefore, at that time, the aforementioned normal video signal Sc can be intermittently obtained.

The synchronizing pulses PBH2 and PBV are supplied to the memory circuit 26 as signals indicative of the timing at which the video signal Sc is supplied to the memory circuit 26. The pulse PBV is supplied to the microcomputer 70 as a signal indicative of the timing of the video signal Sc, thereby generating a write request signal WTRQ. The write request signal WTRQ is supplied to the memory circuit 26.

The sync. generating circuit 61 generates reference synchronizing pulses REFH and REFV having reference horizontal and vertical frequencies, respectively. These reference synchronizing pulses REFH and REFV are also supplied to the memory circuit 26.

As described above, when the normal video signal Sc is obtained, one field of the video signal Sc is written in the field memory of the memory circuit 26 in synchronism with the pulses PBH2 and PBV. Until the next normal video signal Sc is obtained, the video signal Sc written in the field memory is repeatedly read-out therefrom in synchronism with the pulses REFH and REFV. The thus read-out video signal Sc is supplied to the output terminal 28. Therefore, the scan playback is carried out so that a desired picture can be monitored in the fast forward or fast rewind mode, if necessary.

However, if the scan playback is carried out as described above, it causes trouble in the TBC 25, and this will be described hereinunder with reference to FIGS. 2A to 2F. FIGS. 2A to 2F are timing charts to which reference will be made in explaining the present invention, respectively.

Figure 2A:
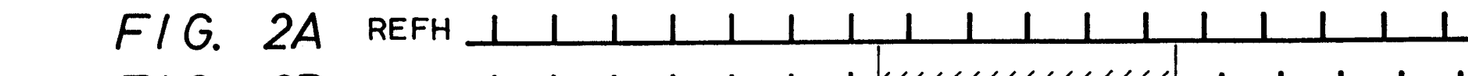
FIGS. 2A to 2F are timing charts to which reference will be made in explaining the present invention.
Figure 2B:
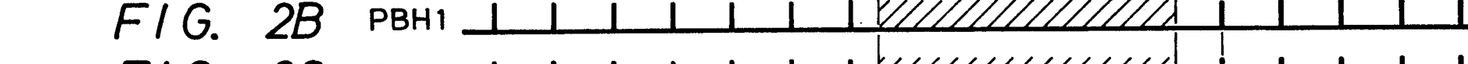
Figure 2C:
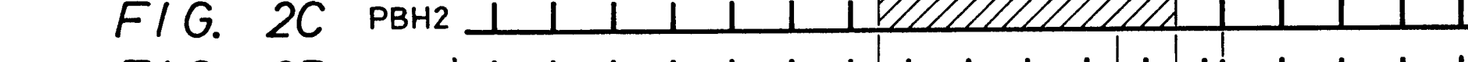

As shown by the time period before the time point t1 in FIGS. 2A to 2C, in the normal playback mode, the reference synchronizing pulse REFH and the reproduced synchronizing pulse PBH1 are substantially the same in phase. Accordingly, as shown by the time period before the time $t_1$ in FIG. 2E, the time base error voltage TBCE more or less fluctuates around a central value Ec thereof in response to a fluctuation of the time base.

If a track jump is carried out during the time between the time $t_1$ and the time $t_2$ in order to effect a scan playback, then the pulses PBH1 and PBH2 derived from the sync. separating circuit 252 become noise components during the period between the times $t_1$ and $t_2$. In practice, the jitter component is compensated for by the CCD 251 so that the pulse PBH2 is delayed in phase from the pulse PBH1 by a predetermined delay time. This is negligible in the following description. Further, the microcomputer 70 controls the low-pass filter 254 so as to hold the value of the time base error voltage TBCE at time point $t_1$ from the time point $t_1$.

If the track jump ends at the time $t_2$ and the tracking is stabilized at the time $t_3$, then the normal pulses PBH1 and PBH2 are again obtained from the next time point $t_4$. The durations of the periods of $t_1$ to $t_2$ and $t_2$ to $t_3$ are, for example, 8 milliseconds and 2 milliseconds, respectively, and the time $t_4$ is the time at which the first pulse PBH1 is generated after the time point $t_3$. Accordingly, as compared with the duration of $t_1$ to $t_3$, $t_3 \approx t_4$ is satisfied.

The time $t_4$ at which the pulse PBH1 is obtained is random relative to the time point whereat the reference synchronizing pulse REFH is obtained, and these two time points are generally not coincident with each other as shown in FIGS. 2A and 2B. If the time points of the two pulses PBH1 and REFH are not coincident, then the TBC 25 must compensate for the time base fluctuation while additionally absorbing the phase difference between the two pulses PBH1 and REFH. Consequently, a wide compensation range is required by the TBC 25.

Figure 2D:
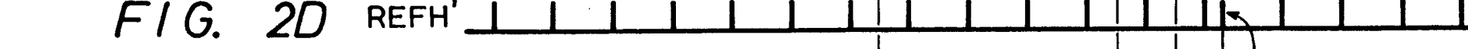

Therefore, when the pulse PBH1 is obtained at the time $t_4$, a control signal HSFT from the microcomputer 70 is supplied to the sync. generating circuit 61, whereby as shown in FIG. 2D the pulse REFH' is reset at the time $t_4$ and is made the same in phase as the pulse PBH1. Thereafter, the pulse REFH' is generated at every horizontal period, and the hold on the TBC 25 is released from the time point $t_4$.

Accordingly, after the time $t_4$, the TBC 25 compensates for the time base fluctuation similarly to the time period before the time $t_1$ so that, when the next vertical synchronizing pulse PBV is obtained, a video signal Sc of one field succeeding to the pulse PBV is written in the memory circuit 26. In practice, it is frequently observed that the time $t_2$ must be delayed until the response of the spindle servo circuit 50 becomes satisfactory after the track jump. For the sake of simplicity, this will not be described herein.

Figure 3A:
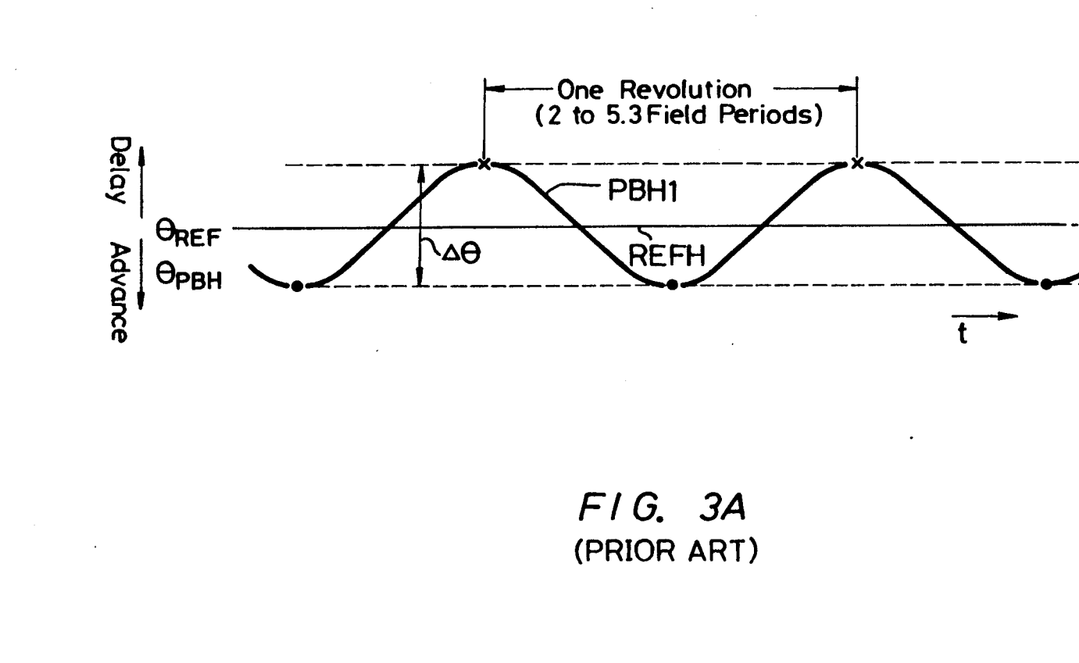
FIGS. 3A to 3C are waveform diagrams to which reference will be made in explaining the defects inherent in the prior-art optical video disc player.
Figure 3B:
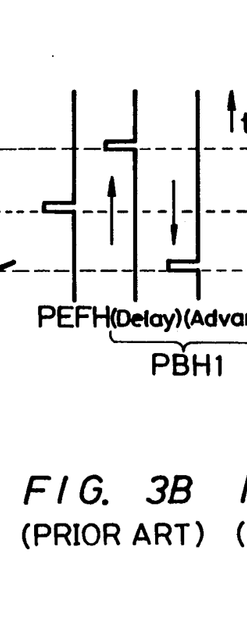

The track on the optical video disc 10 is eccentric so that, while the phase $\theta_{REF}$ of the reference horizontal synchronizing pulse REFH is constant as shown in FIGS. 3A and 3B, the phase $\theta_{PBH}$ of the reproduced horizontal synchronizing pulse PBH1 fluctuates around the phase $\theta_{REF}$ and has a period coinciding with the rotation of the optical video disc 10. In the rotation cycle of the CLV disc 10, one rotation corresponds with a period of 2 fields in the innermost periphery of the disc 10 and about 5.3 fields in the outermost periphery of the disc 10.

In the scan playback mode, the pulse REFH is reset so that it coincides in phase with the pulse PBH1 at the time $t_4$ as described above. Assuming now that this reset time point is the time point at which the delay of the phase $\theta_{PBH}$ of the pulse PBH1 becomes maximum as shown by a cross mark in FIG. 3A, then the TBC 25 must become capable of compensating for the time base of the output video signal Sc in the advanced direction by the peak-to-peak value $\Delta\theta$ in the range in which the phase $\theta_{PBH}$ of the reproduced pulse PBH1 is changed.

Figure 3C:
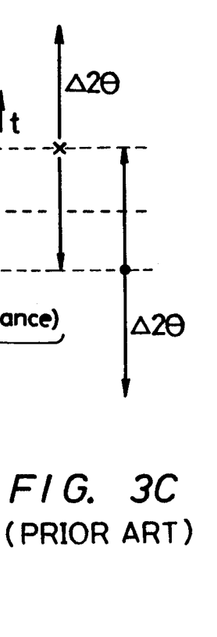

Conversely, assuming that the reset time $t_4$ is the time at which the advance of the phase $\theta_{PBH}$ of the reproduced pulse PBH1 is maximized as shown by a solid circle in FIG. 3A, then the TBC 25 must become capable of compensating for the time base of the output video signal Sc in the delayed direction by a value $\Delta\theta$. Therefore, because the track on the optical video disc 10 is eccentric, the TBC 25 needs a time base compensation range of $2\Delta\theta$ as shown in FIG. 3C, which unavoidably increases the number of coupling stages of the CCD 251.

Figure 2E:
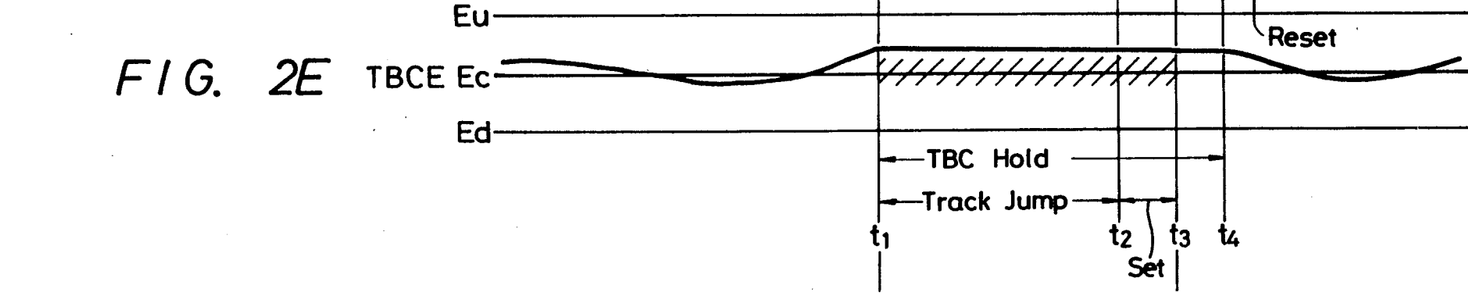
Figure 2F:
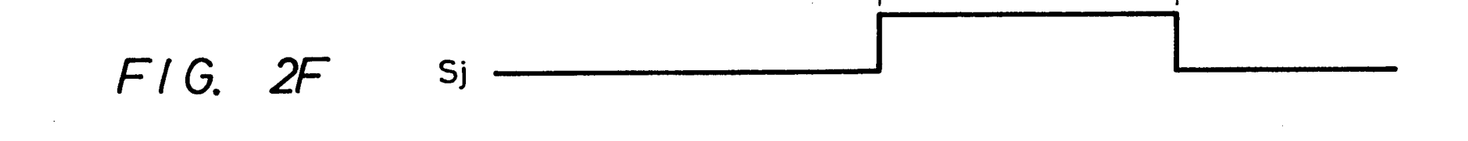

Alternatively, as shown in FIG. 2E, if the time base compensation range of the TBC 25 for the eccentricity of the track on the optical video disc 10 is smaller than the value of $2\Delta\theta$, the time base error voltage TBCE of the TBC 25 is fixed to a maximum value Eu or minimum value Ed of the error output, whereby the TBC 25 can not operate normally, and thus a disturbed picture is reproduced.

OBJECTS AND SUMMARY OF THE INVENTION

Accordingly, it is an object of the present invention to provide an improved optical video disc player which can eliminate the defects encountered with the prior art.

More specifically, it is an object of the present invention to provide an optical video disc player in which the compensation range of the time base fluctuation can be reduced by one-half.

It is another object of the present invention to provide an optical video disc player in which the number of stages of a charge coupled device in the time base corrector can be reduced.

It is still another object of the present invention to provide an optical video disc player in which a reproduced picture during the scan mode can be prevented from being disturbed.

According to a first aspect of the invention, an optical video disc player is provided. The optical video disc player reproduces a reproduced video signal having a time base from constant linear velocity format signals recorded on a track on an optical video disc. The track on the optical video disc is eccentric about a center of eccentricity. The optical video disc player has a scan playback mode in which it reproduces the signals recorded on the track at a fast forward or fast rewind speed. The optical video disc player includes a photo pickup head and a photo pickup head tracking servo circuit. A time base correction circuit in the optical video disc player receives the reproduced video signal, and includes a synchronizing pulse separator circuit that separates a horizontal synchronizing pulse from the reproduced video signal. The time base correction circuit generates a time base error voltage, and corrects the time base of the reproduced video signal in response to the time base error voltage. A scan circuit, in the scan playback mode, moves the photo pickup head in a direction normal to the track while the photo pickup is reproducing the signals recorded on the track, and causes the photo pickup head to make a track jump. An eccentricity detecting circuit generates an eccentricity signal in response to the eccentricity of the track. Finally, a synchronizing circuit, which is responsive to the eccentricity signal generates generating a reference horizontal frequency synchronizing pulse that is synchronized with the horizontal synchronizing pulse separated from the reproduced video signal. The synchronizing circuit supplies the reference horizontal frequency synchronizing pulse to the time base correction circuit.

The second aspect of the invention is a method of reproducing an optical video disc on an optical video disc player in the so-called scan playback mode, in which the optical video disc player reproduces signals recorded on the optical video disc at a fast forward or fast rewind speed. The optical video disc player reproduces a reproduced video signal having a time base from constant linear velocity format signals recorded a track on the optical video disc. The track is eccentric about a center of eccentricity. The method includes the following steps: The recorded video signal from the optical video disc is reproduced by a photo pickup head to provide the reproduced video signal. The tracking of the photo pickup head is controlled by a servo. A horizontal synchronizing pulse is separated from the reproduced video signal. In the scan playback mode, the photo pickup head is moved in a direction normal to the track, which casuses the photo pickup head to make a track jump. The center of eccentricity of the track is detected. After the track jump, and in response to the detected center of eccentricity, a reference horizontal frequency synchronizing pulse synchronized with the horizontal synchronizing pulse separated from the reproduced video signal is generated substantially at the center of eccentricity. Finally, the time base of the reproduced video signal is corrected using the reference horizontal frequency synchronizing pulse.

According to the third aspect of the invention, an optical video disc player is provided. The optical video disc player reproduces a reproduced video signal having a time base from constant linear velocity format signals recorded on a track on an optical video disc. The track is eccentric about a center of eccentricity. The optical video disc player has a scan playback mode in which the optical video disc player reproduces the signals recorded on the track at a fast forward or fast rewind speed. The optical video disc player includes a photo pickup head, and a photo pickup head tracking servo circuit. The optical video disc player also includes a time base correction circuit that receives the reproduced video signal and includes a synchronizing pulse separator circuit that separates a horizontal synchronizing pulse from the reproduced video signal. The time base correction circuit corrects the time base of the reproduced video signal. A scan circuit moves, in the scan playback mode, the photo pickup head in a direction normal to the track while the photo pickup is reproducing the signals recorded on the track, and the photo pickup head makes a track jump in response to a track jump signal. An eccentricity detecting circuit generates an eccentricity signal at a reference time corresponding to the time at which the photo pickup head reproduces the signals recorded on the track substantially at the center of eccentricity. Finally, a track jump signal generating circuit, in response to the eccentricity signal, generates the track jump signal at a track jump time. The track jump time is a time in advance of the reference time such that the track jump is completed by the reference time.

The above, and other objects, features and advantages of the present invention, will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Figure 4:
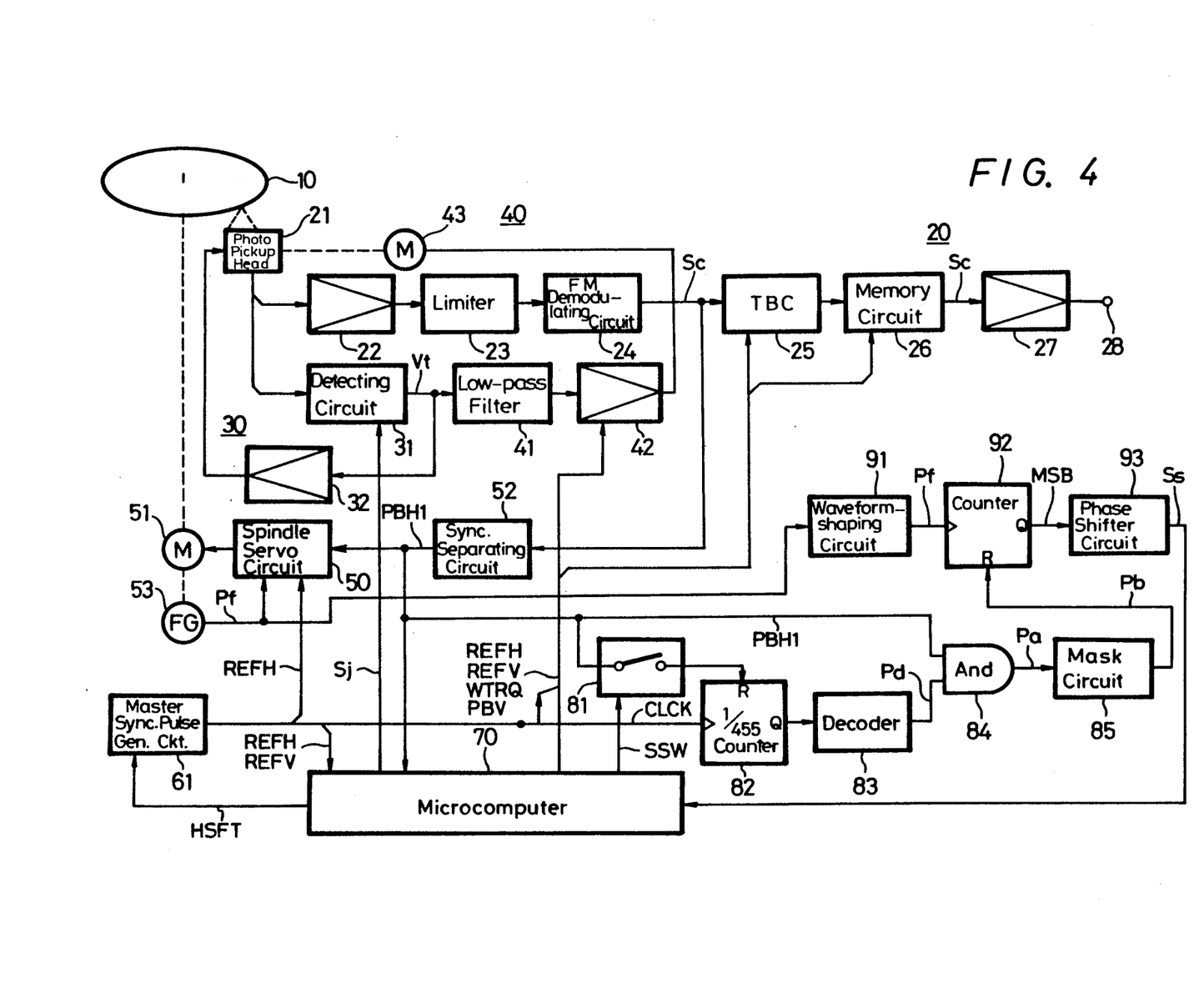
FIG. 4 is a block diagram showing an embodiment of an optical video disc player according to the present invention.

Referring to the drawings in detail, and initially to FIG. 4 and FIGS. 5A to 5D, an embodiment of the optical video disc player according to the present invention will now be described. FIG. 4 is a block diagram showing an overall arrangement of the instant embodiment, and in FIG. 4, like parts corresponding to those of FIG. 1 are marked with the same references and therefore need not be described in detail.

Figure 5A:
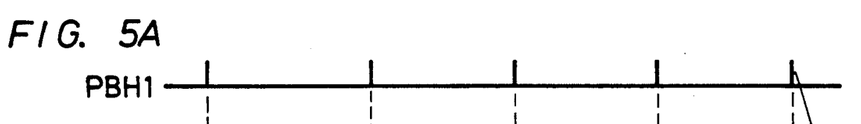
FIGS. 5A to 5L are timing charts to which reference will be made in explaining the operation of the embodiment of FIG. 4.
Figure 5B:
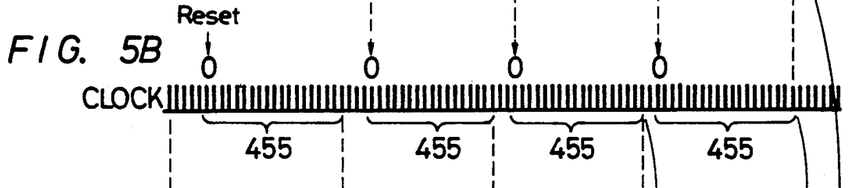
Figure 5C:
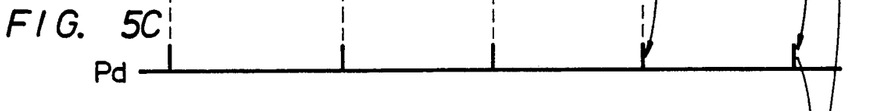
Figure 5D:
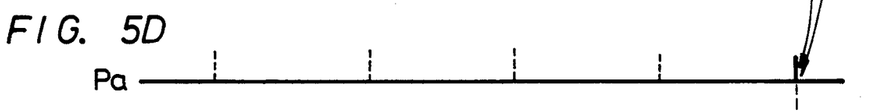

It will be seen in FIG. 4 that, in the scan playback mode, the microcomputer 70 supplies the switching circuit 81 with a control signal SSW, whereby the switching circuit 81 is turned ON to permit the reproduced horizontal synchronizing pulse PBH1 from the horizontal synchronizing pulse separating circuit 52 to be supplied therethrough to a counter 82 as a reset input. A timing chart of this pulse PBH1 is represented in FIG. 5A. The sync. generating circuit 61 generates a clock pulse CLCK (see FIG. 5B) having a frequency, for example, as high as 455 times the normal reference horizontal frequency. This clock pulse CLCK is supplied to the counter 82 as a count input.

A count output of the counter 82 is supplied to the decoder 83 so that when the count value of the counter 82 becomes "455" the decoder 83 generates a pulse Pd (see FIG. 5C) indicative of this count value. The pulse Pd is supplied to one input terminal of the AND circuit 84 which is supplied at its other input terminal with the synchronizing pulse PBH1. Accordingly, the pulse Pd is generated from the decoder 83 at every 455th clock pulse CLCK after the counter 82 is reset by the reproduced horizontal synchronizing pulse PBH1. The frequency of the clock pulse CLCK is as high as 455 times the normal horizontal frequency so that 455 clock pulses CLCK exist in a normal horizontal period.

Figure 5E:
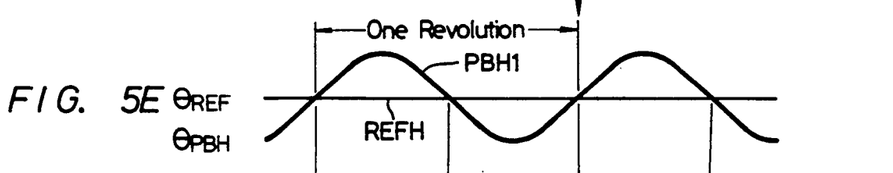
Figure 5F:
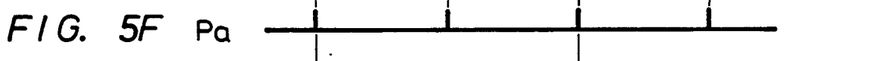

Since the pulse Pd and the reproduced horizontal synchronizing pulse PBH1 are supplied to the AND circuit 84, the AND circuit 84 generates an AND output Pa (see FIG. 5D) when the cycle of the pulse PBH1 is equal to that of the normal horizontal synchronizing period. In other words, as shown in FIGS. 5E and 5F, the pulse Pa is derived from the AND circuit 84 each time the phase $\theta_{PBH}$ of the reproduced horizontal synchronizing pulse PBH1 coincides with the phase $\theta_{REF}$ of the reference horizontal synchronizing pulse REFH. This occurs at or near the center of eccentricity of the track after the track jump is completed.

Figure 5G:
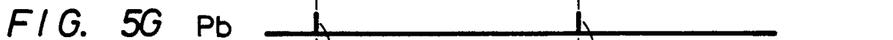

The pulse Pa is supplied to a mask circuit 85, in which it is masked to provide a pulse Pb for every other pulse Pa as shown in FIG. 5G. Thus the period of the pulses Pb is synchronized with and equal to the period of the eccentricity of the track. This pulse Pb is supplied to a counter 92 as a reset input. The counter 92 might be, for example, a divided by 32 scale counter.

The frequency generator 53 is formed to have a number of teeth so as to generate by optical or magnetic detection, for example, 32 pulses Pf per revolution of the optical video disc 10. The waveform of the pulse Pf is represented in FIG. 5H, and this pulse Pf is supplied through a waveform-shaping circuit 91 to the counter 92 as a count input.

Figures 5H, 5I:
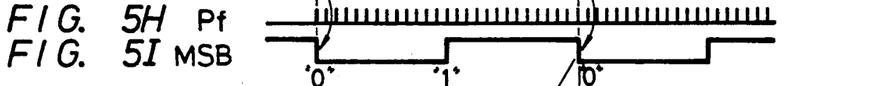

Accordingly, the counter 92 counts the pulse Pf, and is reset by the pulse Pb, whereby the count output signal MSB from the counter 92 becomes "0" in response to each pulse Pb and becomes "1" at the mid time point of the period before the next pulse Pb as shown in FIG. 5I. Therefore, the phase of the eccentricity of the disc 10 is effectively stored by the counter 92.

Figure 5J:
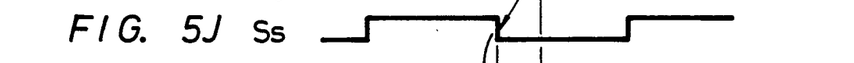

The signal MSB from the counter 92 is supplied to a phase shifter circuit 93, in which it is phase-shifted to provide a signal Ss whose falling edge is advanced in phase, for example, by 10 milliseconds as shown in FIG. 5J. This signal Ss is supplied to the microcomputer 70.

Figure 5K:
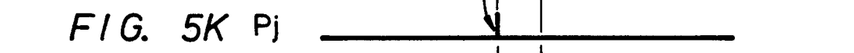
Figure 5L:
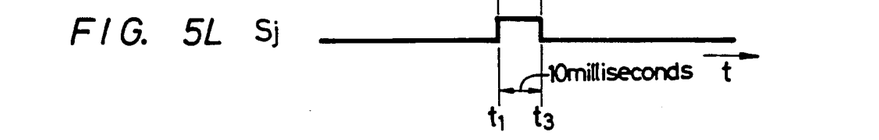

The microcomputer 70 generates the pulse Pj in response to the falling edge of the signal Ss as shown in FIG. 5K and also generates a signal Sj which becomes "1" (high level) in response to the falling edge of the signal Ss and which becomes "0" (low level) 10 ms after the pulse Pb. In that case, the rising edges of the pulse Pj and the signal Sj correspond to the time $t_1$ of FIG. 2, and a track jump is performed by these signals Pj and Sj so that the scan playback is carried out. Further, the falling edge of the signal Sj corresponds to the time point $t_3$ of FIG. 2, and on the basis of the falling edge of the signal Sj, the reference horizontal synchronizing pulse REFH is reset via the control signal HSFT from the microcomputer to the master sync. pulse generator circuit 61 at the time $t_4$ of FIG. 2.

As described above, according to the present invention, in the scan playback mode, the center of the eccentricity of the track ($t_3 \approx t_4$) is detected and the reference horizontal synchronizing pulse REFH is reset substantially at the center of the eccentricity of the track thereby being synchronized with the reproduced horizontal synchronizing pulse PBH1. Thus, when the TBC 25 compensates for the time base fluctuation presented by the eccentricity of the track, the compensation range of the time base fluctuation is $\Delta\theta$, which is one-half of $2\Delta\theta$ in FIG. 3C. Therefore, according to the present invention, it is possible to reduce the number of stages of the CCD 251.

Furthermore, even if the time base compensation range of the TBC 25 relative to the eccentricity of the track is small, the time base error voltage TBCE of the TBC 25 can be prevented from being fixed to the maximum value Eu or minimum value Ed. Therefore, the reproduced picture can be prevented from being disturbed.

Figure 6:
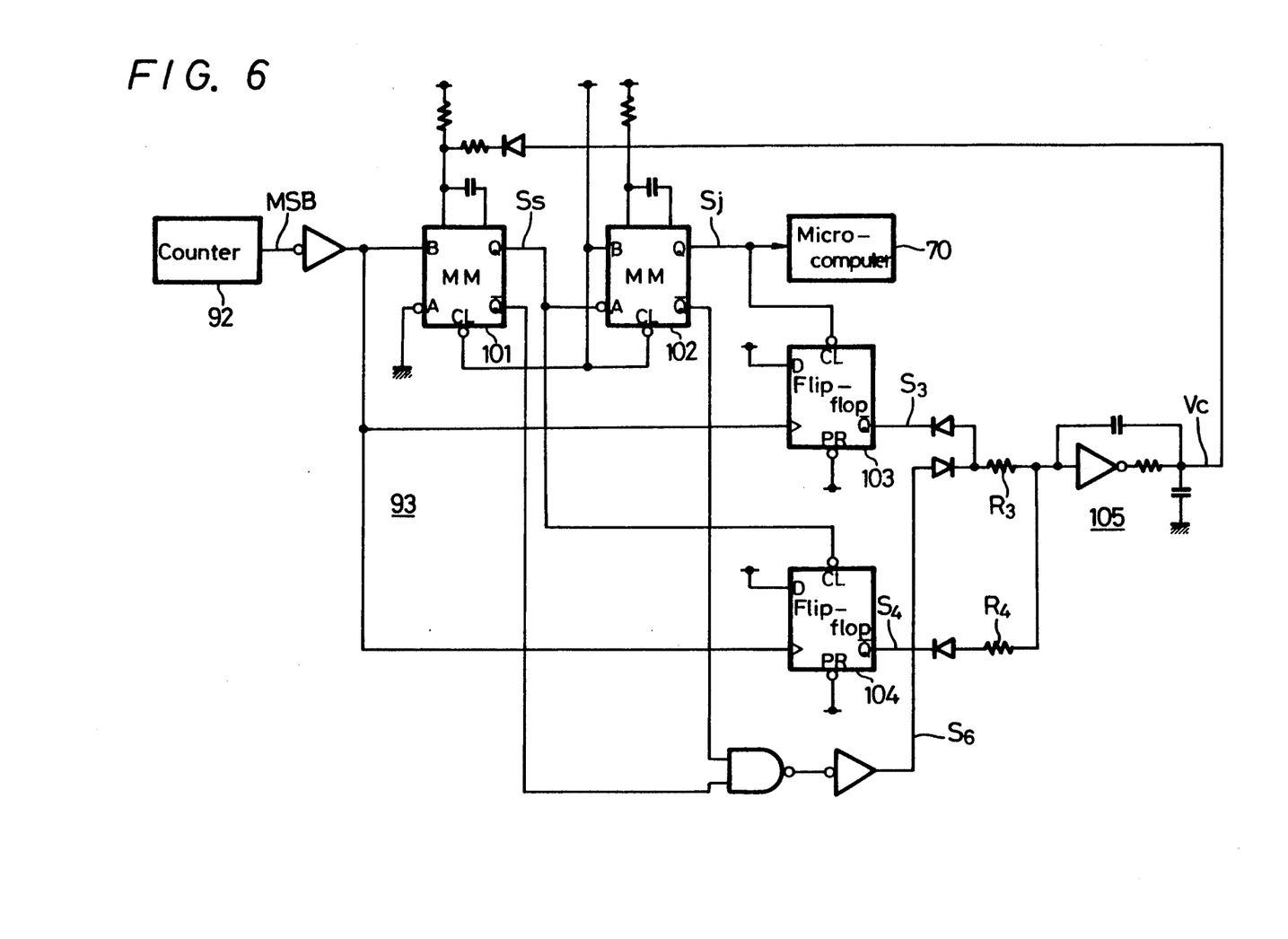
FIG. 6 is a block diagram showing an example of a phase shifter circuit used in the present invention.

FIG. 6 shows in more detail an example of the phase shifter circuit 93 (FIG 4). In this example, the signal Ss is formed from the signal MSB by a negative feedback control operation and the signal Sj is generated by the phase shifter circuit 93 instead of the microcomputer 70.

Referring to FIG. 6, there are provided a variable monostable multivibrator 101 and a fixed monostable multivibrator 102, wherein the signal MSB is supplied to the monostable multivibrator 101 which then generates the signal Ss. This signal Ss is supplied to the monostable multivibrator 102 from which is derived the signal Sj.

D-type flip-flop circuits 103 and 104 and a charge and discharge circuit 105 are respectively provided. These circuits 103, 104 and 105 perform a negative feedback by which the period of "1" of the monostable multivibrator 101 is controlled so that the trailing edge of the signal Ss coincides with the time $t_1$.

Figure 7:
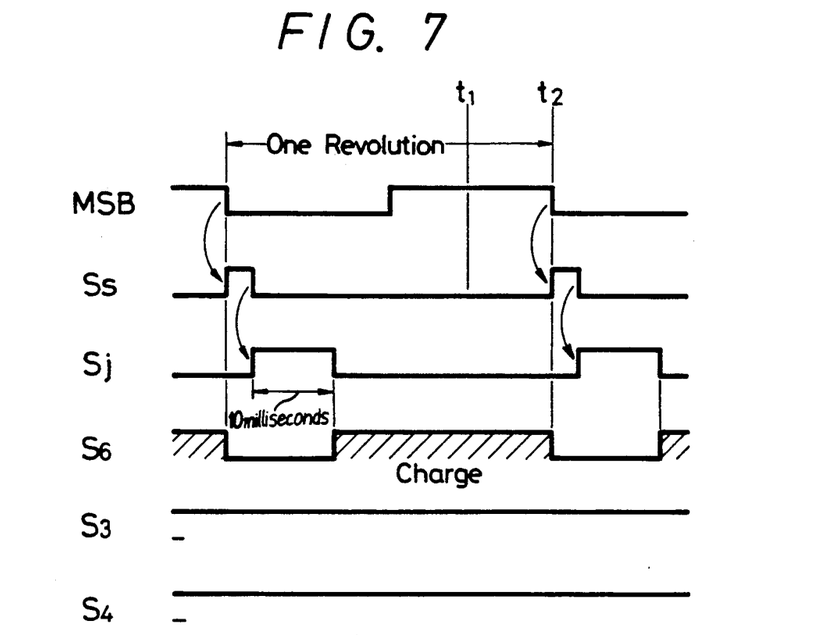
FIGS. 7 to 10 are waveform diagrams to which reference will be made in explaining an operation of the phase shifter circuit of FIG. 6.

As shown in FIG. 7, when the falling edge of the signal Ss occurs before the time $t_1$, the signal S6 is an AND signal of inverted signals of the signals Ss and Sj so that the signal S6 becomes "1" from the falling edge of the signal Sj to the rising edge of the signal Ss.

This signal S6 is supplied to the charge and discharge circuit 105 and the charge and discharge circuit 105 is thereby charged. Then, the output voltage Vc of the charge and discharge circuit 105 is supplied to the time constant portion of the monostable multivibrator 101, whereby the period of "1" of the signal Ss is gradually extended. Thus, the signal Sj is delayed (i.e., is shifted toward the right-hand side of FIG. 7) while keeping a pulse width of 10 milliseconds.

Figure 8:
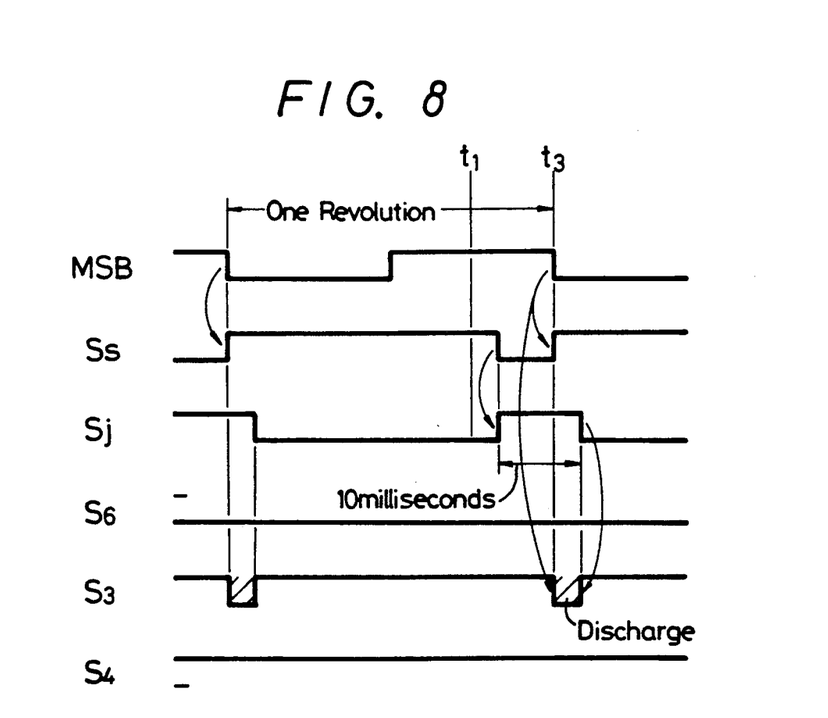

As shown in FIG. 8, when the falling edge of the signal Ss occurs after time $t_1$, the signal S3 is cleared by the falling edge of the signal Sj and is inverted by the falling edge of the signal MSB with the result that the signal S3 becomes "0" from the time $t_3$ to the falling edge of the signal Sj.

This signal S3 is supplied to the charge and discharge circuit 105, whereby the charge and discharge circuit 105 discharges so that the period of "1" of the signal Sj is gradually reduced. Therefore, the signal Sj if advanced (i.e., is shifted towards the left-hand side of FIG. 8) while maintaining a pulse width of 10 milliseconds.

Figure 9:
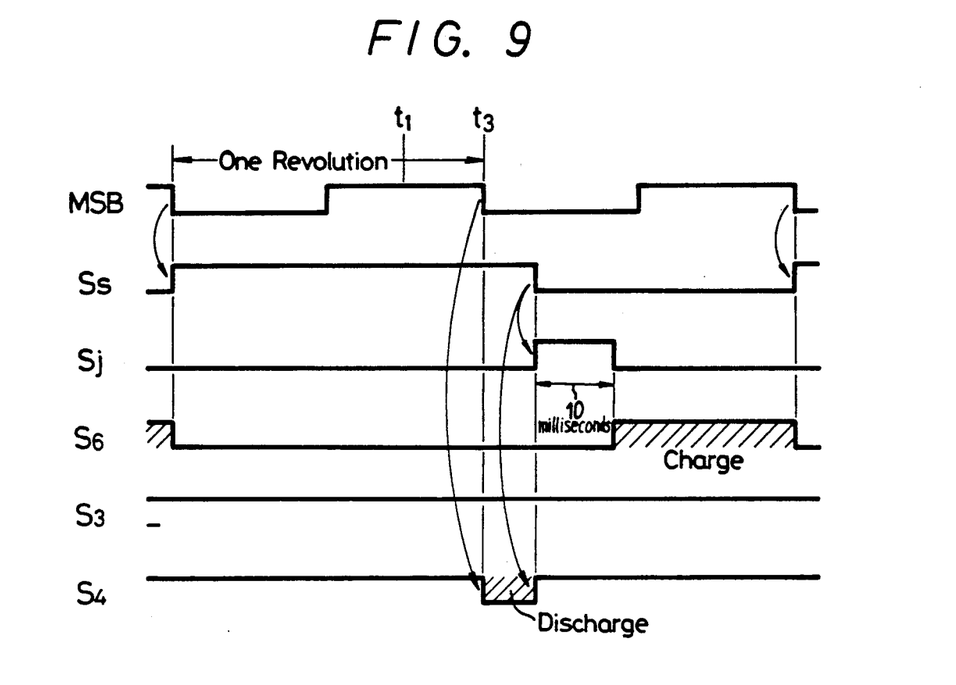

As shown in FIG. 9, when the falling edge of the signal Ss occurs after the time $t_3$, the signal S6 is formed similarly to FIG. 7, whereby the charging is performed by the charge and discharge circuit 105. Further, the signal S4 is cleared by the falling edge of the signal Ss and is inverted by the falling edge of the signal MSB so that the signal S4 remains "0" from the time $t_3$ to the rising edge of the signal Sj. Therefore, the charge and discharge circuit 105 is discharged by the signal 54.

Accordingly, in the case of FIG. 9, the charge and discharge circuit 105 is alternately charged and discharged by the signals S6 and S4. If the resistance values of resistors R3 and R4 through which the signals S6 and S4 (see FIG. 6) flow are selected so as to satisfy $R3>>R4$, for example, are equality of $R3=100 \cdot R4$, then the discharge becomes greater than the charge. As a result, the period of "1" of the signal Ss is gradually reduced, and the signal Sj is advanced while maintaining a pulse width of 10 milliseconds. Thus, the signal Sj is placed in the state shown in FIG. 8.

Figure 10:
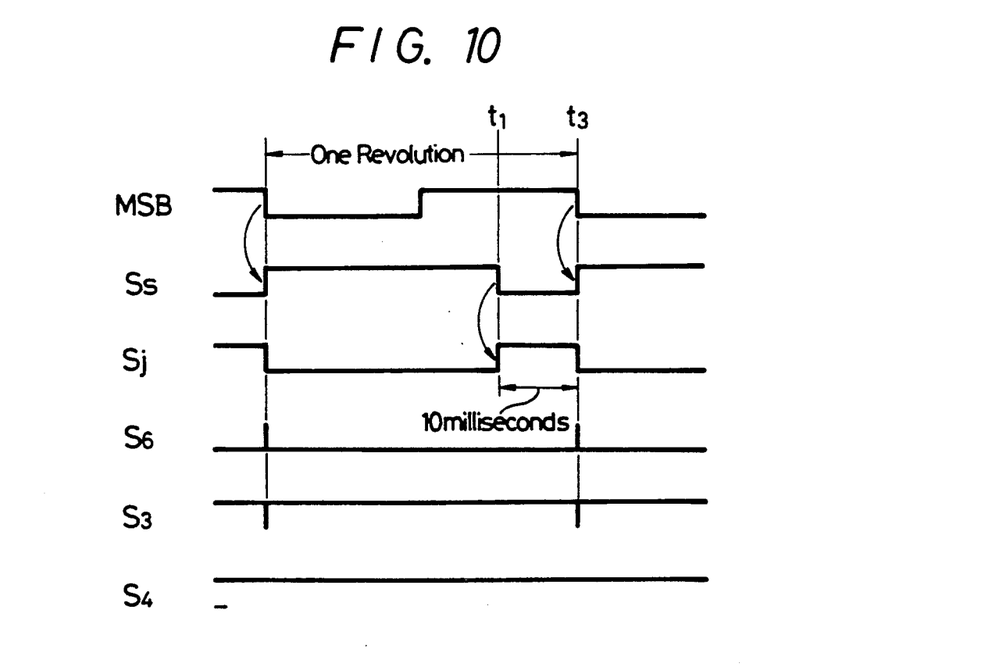

In the steady state, as shown in FIG. 10, the signal Ss falls at the time $t_1$ and the signal Sj becomes "1" during the period from $t_1$ to $t_3$.

As described above, in the scan playback mode, the video signal Sc stored in the memory circuit 26 is read out therefrom during the period in which the video signal Sc can not be normally reproduced. Alternatively, during the period in which the video signal Sc can not be normally reproduced, the video signal Sc can be muted and replaced with a signal which presents, for example, a gray picture.

As described above, according to the present invention, in the scan playback mode, the center of the eccentricity of the track is detected and the reference horizontal synchronizing pulse REFH is reset substantially at the center of the eccentricity of the track thereby being synchronized with the reproduced horizontal synchronizing pulse PBH1 so that, when the TBC 25 compensates for the time base fluctuation presented by the eccentricity of the track, the compensation range of the time base fluctuation is $\Delta\theta$, which is one-half of $2\Delta\theta$. Therefore, according to the present invention, it is possible to reduce the number of stages of the CCD 251.

Furthermore, even if the time base compensation range of the TBC 25 relative to the eccentricity of the track is small, the time base error voltage TBCE of the TBC 25 can be prevented from being fixed to the maximum value Eu or minimum value Ed. Therefore, the reproduced picture can be prevented from being disturbed.

Having described a preferred embodiment of the invention with reference to the accompanying drawings, it is to be understood that the present invention is not limited to that precise embodiment and that various changes and modifications could be effected by one skilled in the art without departing from the spirit or scope of the invention as defined in the appended claims.

I claim as my invention:

1. An optical video disc player, the optical video disc player reproducing a reproduced video signal having a time base from constant linear velocity format signals recorded on a track on an optical video disc, the track being eccentric about a center of eccentricity, the optical video disc player having a scan playback mode in which the optical video disc player reproduces the signals recorded on the track at a fast forward or fast rewind speed, the optical video disc player comprising:

a photo pickup head;

a photo pickup head tracking servo circuit;

a time base corrector means, receiving the reproduced video signal and including a synchronizing pulse separator means for separating a horizontal synchronizing pulse from the reproduced video signal, for generating a time base error voltage, and correcting the time base of the reproduced video signal in response to the time base error voltage;

a scan means for moving, in the scan playback mode, the photo pickup head in a direction normal to the track while the photo pickup is reproducing the signals recorded on the track, and for causing the photo pickup head to make a track jump;

an eccentricity detecting means for generating an eccentricity signal in response to the eccentricity of the track; and a synchronizing means, responsive to the eccentricity signal for generating a reference horizontal frequency synchronizing pulse for application to the time base corrector means, the reference horizontal frequency synchronizing pulse being synchronized with the horizontal synchronizing pulse separated from the reproduced video signal.

2. An optical video disc player according to claim 1, wherein the eccentricity detecting means detects the center of the eccentricity of the track; and after the track jump is completed, the synchronizing means in response to the eccentricity signal, generates, substantially at the center of eccentricity, and supplies to the time base corrector means the reference horizontal frequency synchronizing pulse synchronized with the horizontal synchronizing pulse separated from the reproduced video signal.

3. An optical video disc player according to claim 2, wherein the time base error voltage varies about a central value, and the optical video disc player further comprises a time base error voltage setting means for setting the time base error voltage to the central value.

4. An optical video disc player according to claim 2, wherein the eccentricity detecting means includes a center of eccentricity detecting means, receiving the horizontal synchronizing pulse separated from the reproduced video signal, and clock signal pulses, for generating a signal at the center of eccentricity.

5. An optical video disc player according to claim 4, wherein the center of eccentricity detecting means comprises;

a first counter means for
counting the clock signal pulses and
producing an output value;

a decoder means for generating an output in response to the output value of the first counter means; and an AND gate means for producing an output signal when the output of the decoder means coincides with the horizontal synchronizing pulse separated from the reproduced video signal.

6. An optical video disc player according to claim 5, wherein the synchronizing means comprises a video disc rotation sensing means for generating a pulse output synchronized with the rotation of the optical video disc.

7. An optical video disc player according to claim 6, wherein the synchronizing means further comprises a second counter means for counting the pulse output of the disc rotation sensing means, the second counter means being reset by a signal derived from the output signal from the AND gate.

8. In an optical video disc player, the optical video disc player reproducing a reproduced video signal having a time base from constant linear velocity format signals recorded a track on an optical video disc, the track being eccentric about a center of eccentricity, the optical video disc player having a scan playback mode in which the optical video disc player reproduces the signals recorded on the track at a fast forward or fast rewind speed, a method for reproducing the optical video disc in the scan playback mode, the method comprising the steps of:

reproducing the signals recorded on the track on the optical video disc by a photo pickup head to provide the reproduced video signal servo controlling the tracking of the photo pickup head;

separating a horizontal synchronizing pulse from the reproduced video signal;

moving, in the scan playback mode, the photo pickup head in a direction normal to the track while reproducing the signals recorded on the track, and causing the photo pickup head to make a track jump;

detecting the center of the eccentricity of the track;

after the track jump is completed, generating, substantially at the center of eccentricity, a reference horizontal frequency synchronizing pulse synchronized with the horizontal synchronizing pulse separated from the reproduced video signal, in response to the detected center of eccentricity; and correcting the time base of the reproduced video signal using the reference horizontal frequency synchronizing pulse.

9. The method of claim 8, wherein the step of correcting the time base of the reproduced video signal includes the steps of:

generating a time base error voltage that varies about a central value; and setting the time base error voltage to the central value.

10. An optical video disc player, the optical video disc player reproducing a reproduced video signal having a time base from constant linear velocity format signals recorded on a track on an optical video disc, the track being eccentric about a center of eccentricity, the optical video disc player having a scan playback mode in which the optical video disc player reproduces the signals recorded on the track at a fast forward or fast rewind speed, the optical video disc player comprising:

a photo pickup head;

a photo pickup head tracking servo circuit;

a time base corrector means, receiving the reproduced video signal and including a synchronizing pulse separator means for separating a horizontal synchronizing pulse from the reproduced video signal, for correcting the time base of the reproduced video signal;

a scan means for moving, in the scan playback mode, the photo pickup head in a direction normal to the track while the photo pickup is reproducing the signals recorded on the track, the photo pickup head making a track jump in response to a track jump signal;

an eccentricity detecting means for generating an eccentricity signal at a reference time corresponding to the time at which the photo pickup head reproduces the signals recorded on the track substantially at the center of eccentricity.

a track jump signal generating means, responsive to the eccentricity signal, for generating the track jump signal at a track jump time, the track jump time being a time in advance of the reference time such that the track jump is completed by the reference time.

11. The optical video disc player of claim 10, further comprising a synchronizing means, responsive to the eccentricity signal, for generating a reference horizontal frequency synchronizing pulse synchronized with the horizontal synchronizing pulse separated from the reproduced video signal, and for applying the reference horizontal frequency synchronizing pulse to the time base corrector means.

12. The optical video disc player of claim 11, wherein the synchronizing pulse separator means separates a plurality of horizontal synchronizing pulses from the reproduced video signal, the plurality of horizontal synchronizing pulses including a first horizontal synchronizing pulse, the first horizontal synchronizing pulse is the first horizontal synchronizing pulse separated from the reproduced video signal after the track jump is completed, and the synchronizing means generates the reference horizontal frequency synchronizing pulse synchronized with the first horizontal synchronizing pulse.

13. The optical video disc player of claim 10, wherein the track jump signal generating means includes:
- a means for generating a pulse having a first edge, a second edge, and a fixed duration equal to the time difference between the track jump time and the reference time; and
- a means for synchronizing the second edge of the pulse with the eccentricity signal.

* * * * *